Figures 1, 2, 3:
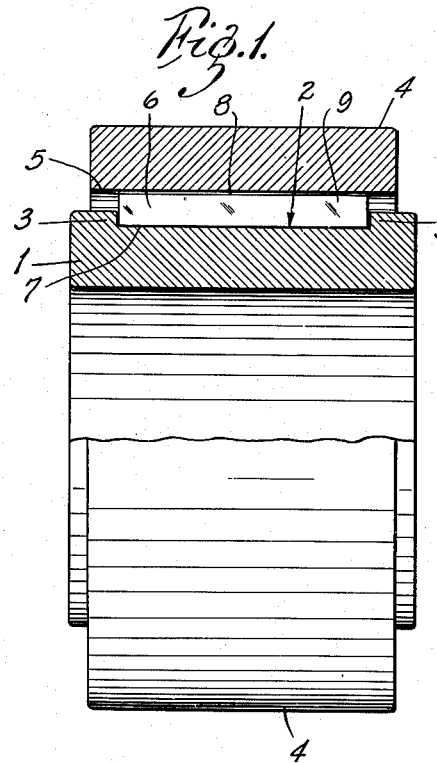

March 1, 1938. W. L. SCRIBNER 2,109,852
SEGMENTAL BEARING
Filed Jan. 4, 1937

INVENTOR:
William L. Scribner
HIS ATTORNEYS.

Patented Mar. 1, 1938

2,109,852

UNITED STATES PATENT OFFICE 2,109,852

SEGMENTAL BEARING

William L. Scribner, Canton, Ohio, assignor to The Timken Roller Bearing Company, Canton, Ohio, a corporation of Ohio Application January 4, 1937, Serial No. 118,954

3 Claims. (Cl. 308—73)

My invention relates to bearings of the floating bushing type and has for its principal objects to improve the lubrication and load carrying capacity of such bearings and to reduce the friction and wear thereon. The invention consists principally in providing a multiplicity of floating bushing segments between the inner and outer race members. The invention further consists in the segmental bearing and in the parts and combinations and arrangements of parts hereinafter described and claimed.

In the accompanying drawing,

Fig. 1 is a part longitudinal sectional view, part elevation of a bearing embodying my invention, Fig. 2 is an end view with portions of the bearing shown in cross section; and Fig. 3 is a detain view on an enlarged scale showing the shape of the bearing segments.

Prior bearings of the floating bushing type have had disadvantages, such as difficulty of lubrication and lack of capacity for self-alinement of the bushing. The present bearing preserves the desirable characteristics of the floating bushing type of bearing and overcomes the disadvantages, by facilitating the lubrication of the bearing and by making the bushing in the form of a multiplicity of segments which are allowed rocking or alining movement with respect to each other.

In the drawing is illustrated a bearing comprising an inner bearing member 1 having a cylindrical raceway 2 around its outer periphery and also having upstanding ribs 3 at the ends of said raceway. A co-operating outer bearing member 4 has a cylindrical bore 5 constituting the outer raceway of the bearing. Interposed between the inner and outer raceways are bearing segments 6 that are of substantially keystone shape in end or sectional view and that are of a length to extend the full length of said inner raceway 2 between said ribs 3. The flat inner faces 7 of the bearing segments 6 make line contact along their middles with the inner raceway. The curved outer faces 8 of the bearing segments have a radius of curvature that is slightly less than that of the outer raceway 5 and hence said outer faces contact along their middle portions with said outer raceway. The sides 9 of the bearing segments taper inwardly of the bearing and are disposed along non-radial lines, their included angle being less than that of a sector drawn from the outer face of the segment. The segments are preferably relatively small in section as compared with their length, those illustrated being about ⅛ inch by ⅛ inch by 1 inch.

The above described construction of the bearing segments provides for thorough lubrication of the bearing at all points. Between adjacent segments 6 is a wedge-shaped space 10 for lubricant, resulting from the non-radial positions of said sides 9. Between the outer raceway 5 and the marginal portions of the outer faces 8 of the bearing segments 6 are also wedge-shaped spaces 11 for lubricant; and between the flat inner faces 7 of the segments and the curved inner raceway 2 are other wedge-shaped lubricant spaces 12. Due to the line contact between the bearing segments and the inner race and to the curvature of the outer faces of said segments being less than the curvature of the outer raceway, the bearing segments are permitted a slight rocking movement, so that squeezing and capillary actions are set up to feed oil into the spaces between the segment faces and the inner and outer raceways. A full complement of segments is used, adjacent segments contacting at their outer corner portions only in normal position.

Besides the thorough lubrication above described, my bearing has other important advantages. The load is distributed over a number of segments, friction and wear are minimized by the limited contact between the segments and the race members, and the segments may rock to accommodate themselves to the load.

The invention is obviously applicable to a bearing of the taper type, that is the inner and outer raceways may be conical and the bearing segments may taper from end to end. Numerous other changes may be made without departing from the invention and I do not wish to be limited to the precise construction shown.

What I claim is:

1. An antifriction bearing comprising an inner bearing member, an outer bearing member and segmental bearing elements of keystone section therebetween, said bearing elements having sides that taper throughout their length towards the axis of the bearing, plane inner faces and convexly curved outer faces, the curvature of said outer faces being less than that of the outer bearing member, and the adjacent sides of each pair of said bearing elements diverging inwardly from the ends of said curved outer faces.

2. An antifriction bearing comprising an inner bearing member, an outer bearing member and segmental bearing elements of keystone section therebetween, said bearing elements having sides that taper throughout their length towards the axis of the bearing, plane inner faces and convexly curved outer faces, the curvature of said outer faces being less than that of the outer bearing member, the adjacent sides of each pair of said bearing elements diverging inwardly from the ends of said curved outer faces, one of said bearing members having ribs to hold said segments against endwise movement.

3. An antifriction bearing comprising an inner bearing member, an outer bearing member and a multiplicity of segmental bearing elements of keystone section therebetween, said bearing elements having plane inner faces, convexly curved outer faces and non-radial sides, the adjacent sides of each pair of said bearing elements diverging inwardly from the ends of said curved outer faces, the curvature of said outer faces being less than that of the outer bearing member.

WILLIAM L. SCRIBNER.